United States Patent [19]

Alexeevsky et al.

[11] 3,876,751

[45] Apr. 8, 1975

[54] METHOD FOR PRODUCING POLYCRYSTALLINE BORON NITRIDE

[76] Inventors: Vladimir Petrovich Alexeevsky, ulitsa Cheljuskintsev, 15, kv. 7; Anatoly Vasilievich Bochko, ulitsa Artema, 42, kv. 12; Sanzhik Sarkisovich Dzhamarov, ulitsa Frunze, 152, kv. 112; Dmitry Moiseevich Karpinos, ulitsa Nikolsko-Botanicheskaya, 14, kv. 16; Gennady Gavrilovich Karjuk, ulitsa Korotchenko, 17a, kv. 60, all of Kiev; Ivan Potapovich Kolomiets, ulitsa Frunze, 18, kv. 16, Poltava; Alexandr Vyacheslavovich Kurdjumov, ulitsa Dobrokhotova, 28, kv. 97, Kiev; Mikhail Spiridonovich Pivovarov, ulitsa Frunze, 98, kv. 25, Poltava; Ivan Nikitovich Frantsevich, ulitsa Cheljuskintsev, 15, kv. 8; Vladimir Vasilievich Yarosh, ulitsa Boichenko, 8, kv. 213, both of Kiev, all of U.S.S.R.

[22] Filed: Dec. 18, 1973

[21] Appl. No.: 425,834

[30] Foreign Application Priority Data
Dec. 18, 1972 U.S.S.R............................. 1557833

[52] U.S. Cl. .................. 423/290; 51/307; 264/65; 106/55
[51] Int. Cl............................................ C01b 21/06
[58] Field of Search ......... 423/290; 264/65; 51/307; 106/55

[56] References Cited
UNITED STATES PATENTS

| 3,212,851 | 10/1965 | Bundy et al......................... 423/290 |
| 3,212,852 | 10/1965 | Bundy................................. 423/290 |
| 3,816,085 | 6/1974 | Hall..................................... 51/307 |

OTHER PUBLICATIONS

G. A. Adadurou et. al., "Doki. Akad. Nauk, U.S.S.R." Vol. 172, (5), 1967, pp. 1066–1068, Russia, (Copy in Sci. Library).

*Primary Examiner*—G. O. Peters
*Attorney, Agent, or Firm*—Holman & Stern

[57] ABSTRACT

A mixture containing less than 50 wt. percent of graphite-like boron nitride treated by a shock wave and highly defective wurtzite-like boron nitride obtained by a shock-wave method is compressed and heated at pressure and temperature values corresponding to the region of the phase diagram for boron nitride defined by the graphite-like boron nitride compact modifications of boron nitride equilibrium line and the cubic boron nitride wurtzite-like boron nitride equilibrium line, whereby the resulting crystals of boron nitride exhibit a structure of wurtzite-like boron nitride or of both wurtzite-like and cubic boron nitride.

The resulting material exhibits higher plasticity as compared with polycrystalline cubic boron nitride, while tools made of this compact polycrystalline material have a longer service life under impact loads in machining hardened steel and chilled iron.

3 Claims, 1 Drawing Figure

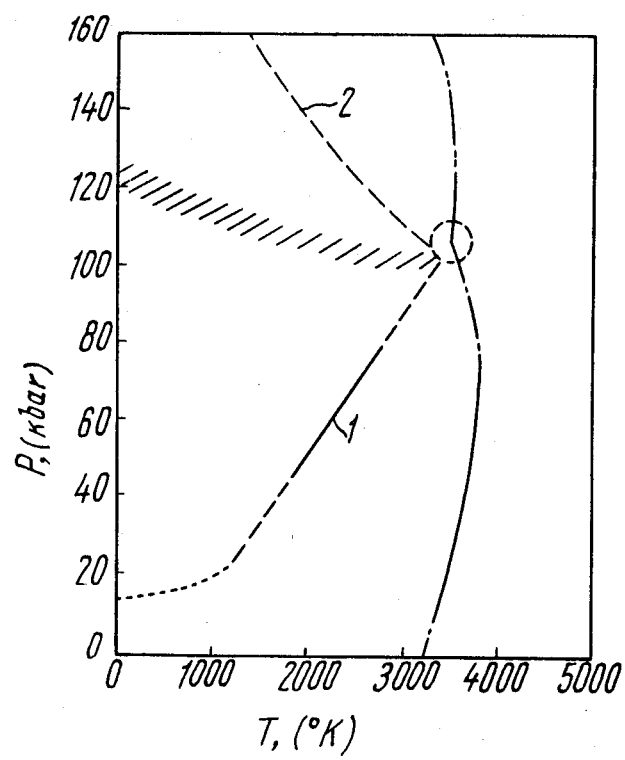

3,876,751

METHOD FOR PRODUCING POLYCRYSTALLINE BORON NITRIDE

BACKGROUND OF THE INVENTION

The present invention relates to the production of superhard materials, and more specifically to methods of producing polycrystalline boron nitride.

The invention will find wide application preferably in making cutting tools.

Known in the art is a method of producing a superhard material, such as cubic boron nitride comprising the step of converting graphite-like boron nitride into cubic modifications thereof under ultrahigh pressure values (of about 40 kbars) and at elevated temperatures (about 1000°C). The process of the phase conversion of the starting boron nitride is conducted in the presence of catalysts selected from alkali and alkaline earth metals (cf. U.S. Pat. No. 2,947,617). The resulting material is obtained in the form of single crystals having a Mohs' hardness of about 10 and high thermal stability (conversion temperature into graphite-like boron nitride is about 1500°–1800°C in a vacuum). In addition, the resulting material does not exhibit any chemical affinity with iron.

All of the above-mentioned properties are extremely valuable when the material obtained by such a method is to be used for machining. However, the size of single crystals thus obtained does not exceed 200-300 $\mu$m. For that reason, though they are used in grinding tools, they however are not employed for making unique-crystal tools. Therefore, the field of application of cubic boron nitride is restricted, and the advantages inherent to this material cannot be completely utilized.

Known in the art are also methods of producing compact polycrystalline materials from graphite-like boron nitride in the presence of a small quantity of alkali and alkaline earth metals, nitrides of such metals, as well as nitrides, borides and carbides of transition metals.

In this case the process of the phase conversion of hexagonal graphite-like boron nitride into the cubic modification thereof is conducted under ultrahigh pressure above 55 kbars and at elevated temperatures above 1500°C.

Polycrystalline boron nitride obtained by this method is characterized by a high hardness and may be efficiently used in machining steel and case iron. However, under impact loads, cutting edges of tools made of such material are normally sheared off due to low plasticity of the polycrystalline boron nitride.

It is also known to produce cubic boron nitride by compressing a mixture of wurtzite-like boron nitride obtained by a shock-wave method and cubic boron nitride subjected to a shock-wave treatment. The mixture is compressed under a pressure above 50 kbars with subsequent sintering at temperatures above 1200°C (of said-open FRG application No. 2,235,240).

Polycrystalline material obtained by this method may be efficiently used in making cutting tools for machining hardened steel and chilled iron, but due to its rather high hardness and insufficient plasticity, such material can hardly withstand impact loads. In addition, in order to produce such polycrystalline material, it is necessary to obtain beforehand cubic boron nitride powder required for the preparation of the starting mixture, whereby the production method becomes more complicated.

SUMMARY OF THE INVENTION

It is an object of the invention to eliminate the above disadvantages.

Another object of the invention is to provide a method of producing polycrystalline boron nitride which enables more plastic crystals of boron nitride to be obtained as compared with cubic boron nitride so that they could be used in machining hardened steel and chilled iron under impact loads.

Still another object of the invention is to provide a method of producing polycrystalline boron nitride which enables boron nitride crystals to be obtained which are capable of withstanding impact loads during metal cutting, while simplifying the production method.

These objects are accomplished by the provision of a method of producing polycrystalline boron nitride comprising the step of compressing a mixture having as one of the components thereof, highly defective wurtzite boron nitride obtained by a shock-wave method, wherein according to the invention said mixture contains, in combination with the wurtzite-like boron nitride, less than 50 wt. percent of graphite-like boron nitride subjected to a shock-wave treatment, and the mixture is compressed and heated at temperature and pressure values corresponding to the region of the phase diagram for boron nitride which is defined by the graphite-like boron nitride compact modifications of boron nitride equilibrium line and the cubic boron nitride wurtzite-like boron nitride equilibrium line.

Said mixture of the starting components is preferably subjected to a pressure of about 50–300 kbars and temperatures of about 20°–3000°C. The crystals of boron nitride obtained by the method according to the invention are compact (void ratio of 2–5 percent), they have a pycnometric density of 3.25–3.38 g/cm$^3$, while their microscopic hardness is within the range of 4,000–6,000 kg/mm$^2$ as compared to 7,000–8,000 kg/mm$^2$ for polycrystalline cubic boron nitride. The resulting material has greater plasticity as compared to that of polycrystalline cubic boron nitride. Tools made of this compact polycrystalline material having a longer service life in machining hardened steel and chilled iron under impact loads.

Furthermore, according to the invention, said mixture is preferably protected against direct contact with a pressure transmitting medium. This allows for obtainment of crystals of boron nitride having the wurtzite structure due to the fact that eventual impurities which could nucleate the seeding crystals of cubic boron nitride are prevented from penetrating into the mixture.

DETAILED DESCRIPTION OF PREFERRED EMBODIMENTS

Other objects and advantages of the invention will be better understood from the following detailed description of the method of producing polycrystalline boron nitride with reference to the accompanying phase diagram for boron nitride (Bundy-Wentorf diagram) and to illustrative examples of specific embodiments of the method according to the invention.

In the method according to the invention the starting material comprises a mixture containing wurtzite-like boron nitride obtained from hexagonal graphite-like boron nitride subjected to a shock-wave treatment under a pressure of 100–200 kbars, as well as graphite-like boron nitride which has been subjected to a similar treatment but has not been converted into its compact modification.

Wurtzite-like boron nitride used herein is characterized by a high degree of disintegration and is very defective, that is the physical widening of the lines on the X-ray pattern in the plane 110 for copper radiation is of about $1.7 \cdot 10^{-2}$ radn, the temperature of reconversion into graphite-like boron nitride is about 600°C, its specific surface being at least 20 m²/g, pycnometric density being within the range of 3.10–3.38 g/cm³, red light and refraction index being somewhat lower than 2.10.

After having been treated by shock-waves the structure of graphite-like boron nitride also becomes defective and disintegrated to a larger extent (the physical widening of the lines on the X-ray pattern in the plane 110 for copper radiation is of about $1.2 \cdot 10^{-3}$ radn, pycnometric density is 1.92–2.35 g/cm³, and specific surface is 10–20 m²/g).

It is herein contemplated to use the starting mixture containing less than 50 wt. percent of graphite-like boron nitride subjected to the shock-wave treatment so that strong, highly abrasion-resistant crystals could be produced, in which graphite-like boron nitride had been substantially completely converted into boron nitride having the wurtzite-like or cubic boron nitride structure. The use of the above-mentioned amount of graphite-like boron nitride is economically advantageous, while at the same time the technological difficulties associated with the abrasive wear of the compression equipment are eliminated, and jamming during the compression of the starting mixture is also reduced as compared to the compression of cubic boron nitride and wurtzite-like boron nitride, thereby increasing the productivity of the process. Therefore, the use of graphite-like boron nitride simplifies the production technique.

The above-described mixture containing wurtzite-like boron nitride and graphite-like boron nitride is poured into a high-pressure container and is compressed and sintered. Since the starting mixture comprises wurtzite-like boron nitride, the compression and sintering by the method according to the invention are conducted in the region of thermodynamic stability of compact modifications of boron nitride so as to eliminate the reconversion of these modifications into the structure of graphite-like boron nitride and the worsening of the abrasive properties thereof. The lower boundary of this range is represented by the compact modifications of boron nitride hexagonal graphite-like boron nitride equilibrium line 1 on the Bundy-Wentorf diagram.

Where crystals having preferably the structure of wurtzite-like boron nitride are to be obtained, the sintering should be conducted below the wurtzite-like boron nitride cubic boron nitride equilibrium line 2 on the same diagram.

With the temperature range of 20°–3000°C disclosed herein, in accordance with the diagram, and extrapolating the respective curves 1 and 2, a required pressure range may be defined which in this method is from 50 to 300 kbars.

Due to a high degree of disintegration and defectivity of the starting components, as well as due to the presence of the wurtzite structure in the mixture, the sintering is conducted at lower temperatures and under lower pressures than those generally used in preparing cubic boron nitride from graphite-like boron nitride, without using catalysts and without any shock-wave treatment when the pressure is in the range of 120–140 kbars and at temperatures of 1900°–2500°C.

Where crystals with the wurtzite structure only are to be obtained, the starting mixture should have a minimum content of graphite-like boron nitride subjected to the shock-wave treatment, the mixture being prevented from directly contacting a graphite heater and the pressure transmitting medium by providing a shield made, e.g., of nickel, titanium, molybdenum, tantalum, tungsten, that is of materials which do not exhibit catalytic activity in relation to boron nitride.

The presence of the components specified by the method according to the invention may be revealed in the final product by means of an X-ray structural analysis. In order to control the abrasive properties and the degree of plasticity of the resulting boron nitride crystals, it is herein contemplated to introduce into the starting mixture prior to the sintering operation, certain additives, such as diamonds, carbides and nitrides, except for cubic boron nitride.

Boron nitride crystals obtained by the method according to the invention are compact (void ratio of 2–5 percent), they have a density of 3.25–3.38 g/cm³, and their microscopic hardness is within the range of 3,000–7,000 kg/mm².

When using these crystals in forming cutting tools for machining hardened steel and chilled iron, machine components of the accuracy class 1–2 and with a surface finish of the 8–9 class can be obtained.

The cutting speed for such tools varies from 60 m/min up to 200 m/min for steel and from 50 m/min up to 300–400 m/min for chilled iron.

The feed is variable from 0.02 to 0.11 mm per revolution, and the cutting depth is from 0.1 mm to 1.5 mm.

EXAMPLE 1

A starting mixture containing 10 wt. percent of graphite-like boron nitride and 90 wt. percent of wurtzite-like boron nitride obtained by a shock-wave treatment of the starting graphite-like boron nitride with a shock-wave front pressure of about 120 kbars was poured into a graphite heater, compressed under a pressure of 80 kbars and heated at 1600°–1800°C for 1–2 minutes to obtain strong compact black cakes with a void ratio of 2–3 percent, exhibiting both wurtzite and cubic boron nitride structures with a microscopic hardness of 5,000–6,000 kg/mm².

Cutting tools made of such polycrystalline boron nitride had a life of 60–80 minutes until the wear of the trailing edge $\Delta h = 0.4$ mm when turning hardened steel (HRc 60-65) at a cutting speed of 80–100 m/minute, with a longitudinal feed $s = 0.07$ mm per revolution and a cutting depth $t = 0.2$ mm; the surface finish was of the 8–9 class.

Carbide-tipped tools pratically could not work under such cutting conditions (a life of 0.5–1 minute).

EXAMPLE 2

A starting mixture containing 5 wt. percent of graphite-like boron nitride and 95 wt. percent of wurtzite-like boron nitride obtained by a shock-wave treatment of the starting graphite-like boron nitride with a shock wave front pressure of 120 kbars was poured into a graphite heater and protected against direct contact therewith by means of a nickel shield. The mixture was compressed under a pressure of 80 kbars and heated at 1500°C for 2–3 minutes to obtain strong compact cakes exhibiting a wurtzite structure with a void ratio of 2–3 percent and a microscopic hardness of 4,000–5,000 kg/mm².

Cutting tools made of this material had a life of about 80 minutes until the wear of the trailing edge $\Delta h = 0.4$ mm when turning hardened steel (HRc 56–58) at a cutting speed $v = 100$ m/min, with a longitudinal feed $s = 0.11$ mm per revolution and a cutting depth $t = 0.3$ mm; the surface finish was of the 8–9 class. The life of carbide-tipped tools was 5–7 minutes.

EXAMPLE 3

Polycrystalline material produced by the method described in Examples 1 and 2 was used to make tools capable of machining hardened steel surfaces (HRc 55–65) under impact loads.

The life of these tools in turning a cylindrical steel blank steel (HRc 62) with three circumferential rows of bores (four bores per each row) of 10 mm diameter drilled in the radial direction was 15 minutes under the following cutting conditions: $v = 225$ m/min, $s = 0.07$ mm per revolution and $t = 0.15$ mm.

With $v = 100$ m/min, $s = 0.07$ mm per revolution and $t = 0.2$ mm the tool life was 25 minutes.

Carbide-tipped tools normally sheared off at the beginning of the machining of a discontinuous surface (surface with recesses).

EXAMPLE 4

A starting mixture containing 45 wt. percent of graphite-like boron nitride and 65 wt. percent of wurtzite-like boron nitride obtained by a shock-wave treatment of the starting graphite-like boron nitride with a shock wave front pressure of about 100 kbars was placed into a graphite heater without a metallic shield, compressed under a pressure of about 100 kbars and heated at 2,000°C for one minute to obtain cakes exhibiting both wurtzite and cubic boron nitride structures with the properties identical to those described in Example 1.

EXAMPLE 5

A starting mixture containing mainly pure wurtzite-like boron nitride (about 99 wt. percent) obtained by a shockwave treatment of the starting graphite-like boron nitride with a shock wave front pressure of about 130 kbars was poured into a graphite heater with a molybdenum shield. The mixture was compressed under a pressure of 55 kbars and heated at 1,000°C to obtain cakes with a void ratio of about 5% and microscopic hardness of 3,000–4,000 kg/mm², which when used in tools were especially efficient in machining discontinuous zones of blanks.

All values of pressure and temperature given in the above Examples are within the above-mentioned region of the Bundy-Wentorf phase diagram for boron nitride and enable the production of the material according to the invention having the properties given in the description and illustrative examples.

What is claimed is:

1. A method of producing polycrystalline boron nitride comprising the steps of: preparing a mixture containing highly defective boron nitride having a wurtzite structure obtained by a shock-wave method and less than 50 wt. percent boron nitride of a graphite structure subjected to a shock-wave treatment; compressing and heating the mixture at temperature and pressure values corresponding to the region of the phase diagram for boron nitride defined by boron nitride of a graphite structure compact modifications of boron nitride equilibrium line and the cubic boron nitride-boron nitride of a wurtzite structure equilibrium line.

2. The method as claimed in claim 1, wherein the mixture is subjected to a pressure between 50 and 300 kbars and a temperature between 20°C and 3,000°C.

3. The method as claimed in claim 1, further comprising the step of shielding said mixture, during the compression and heating, from directly contacting a pressure transmitting medium so as to produce polycrystalline boron nitride having the wurtzite structure.

* * * * *